(No Model.)
E. HACKH.
PHOTOGRAPHIC CAMERA.
No. 401,946. Patented Apr. 23, 1889.
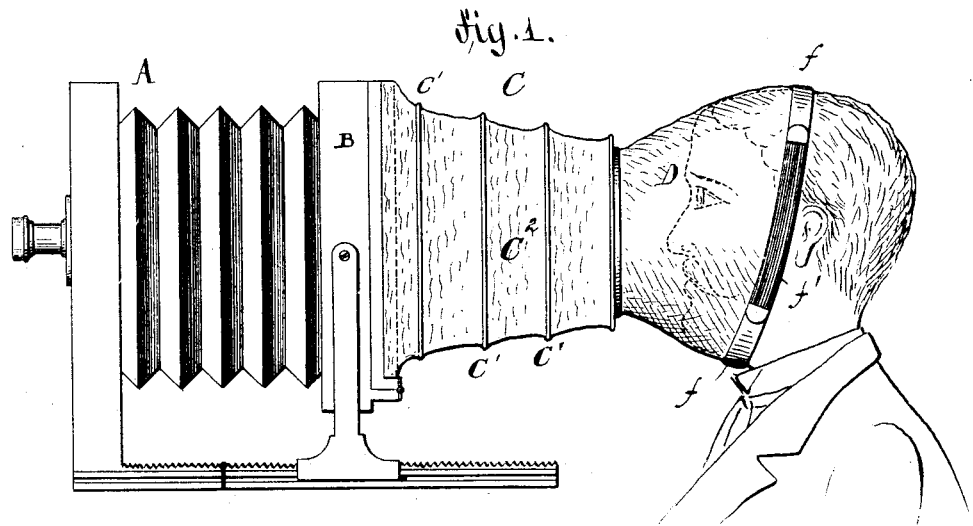
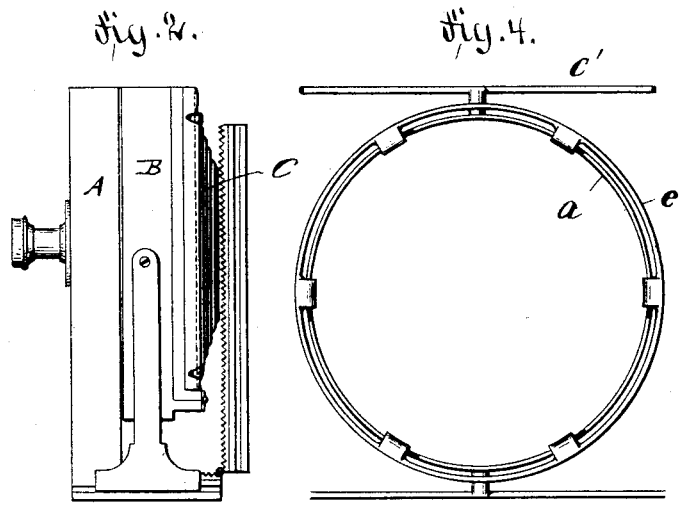
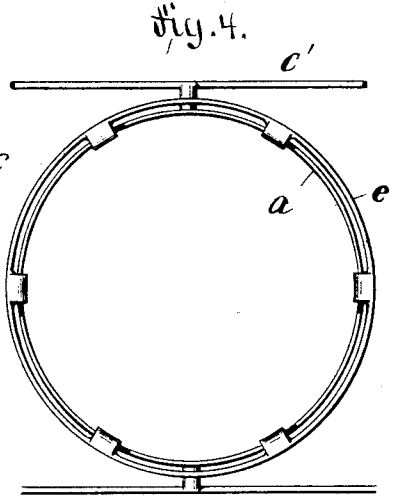
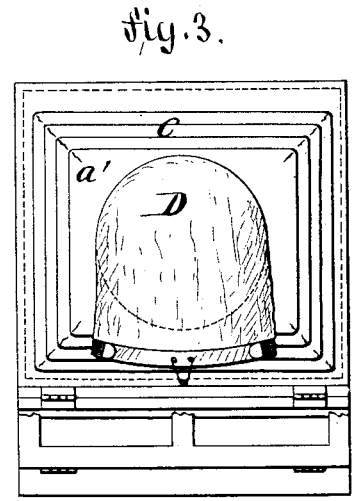
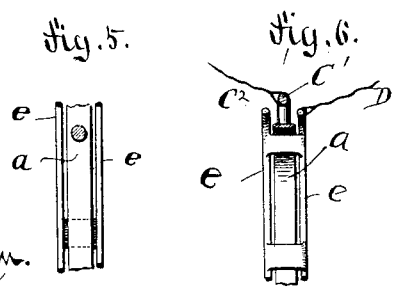
WITNESSES:
INVENTOR
Eugen Hackh
BY
ATTORNEYS.

UNITED STATES PATENT OFFICE.

EUGEN HACKH, OF NEW YORK, N. Y.

PHOTOGRAPHIC CAMERA.

SPECIFICATION forming part of Letters Patent No. 401,946, dated April 23, 1889.

Application filed September 6, 1888. Serial No. 284,715. (No model.)

*To all whom it may concern:*

Be it known that I, EUGEN HACKH, of the city, county, and State of New York, have invented certain new and useful Improvements in Photographic Cameras, of which the following is a specification.

The focusing-cloth which is used by photographers and amateurs in photography for the purpose of focusing a picture is very inconvenient to handle, inasmuch as both hands are needed for adjusting the cloth over the camera and the head of the operator. The use of the focusing-cloth is more especially connected with considerable annoyance in amateur photography in making outdoor pictures in windy weather, as great attention has to be paid to the handling and proper adjustment of the focusing-glass.

The object of this invention is to overcome the defects set forth and combine the focusing-cloth with the camera in a permanent and convenient manner, so that the same can be quickly placed over the head of the operator and detached therefrom, the focusing-cloth being folded up close to the frame after use, so as to become a part of the camera, and be more compactly arranged thereon and instantly ready for use when required for focusing purposes.

The invention consists in the combination, with a photographic camera, of a focusing-frame provided with a focusing-cloth made of folding and expansible sections, and of an axial adjustable head-piece provided with elastic bands for applying to the head, as will be fully described hereinafter, and finally be pointed out in the claims.

In the accompanying drawings, Figure 1 represents a side elevation of a photographic camera with my improved focusing-cloth attachment shown as applied to the head of an operator. Fig. 2 is a side view of the camera and its focusing-cloth attachment folded up after use. Fig. 3 is a rear elevation of the camera with its focusing-cloth attachment. Figs. 4, 5, and 6 are details of the connection of the head-piece with the body of the focusing-cloth attachment.

Similar letters of reference indicate corresponding parts.

In the drawings, A represents a photographic camera of any approved construction, and B the focusing-frame of the same, to which my improved focusing-cloth attachment is applied. The focusing-cloth attachment C is formed of a main part, which is provided with oblong wire frames C', of gradually-diminishing size, said frames being connected by a suitable black cloth, C², so that the intermediate sections can be folded up, one into the other and against the focusing-frame B, as shown in Fig. 2. The outermost wire frame C' supports by means of studs (shown in Fig. 4) a ring-shaped frame, a, of smaller size than the wire frame C', said ring-shaped frame a being connected by a cloth-filling, a', with the oblong wire frame C'. On the ring-shaped frame a is guided a surrounding ring, e, to which a funnel-shaped cap or head-piece, D, is applied, which is provided at its outer end with top and bottom straps, f, and at the sides with elastic straps f', by which the top and bottom straps, and thereby the cap or head-piece, are tightly applied to the crown and chin of the head of the operator, as shown in Fig. 1.

When the camera is turned on its side, for the purpose of taking landscapes or other pictures of greater width than height, then the cap or head-piece D is turned by the ring-connection on its axis to an angle of ninety degrees, so as to be capable of attachment to the head of the operator in the same manner as before. After use the cap or head-piece D, as well as the folding body C, are folded up tightly against the focusing-frame and strapped thereto in any suitable manner, so as to be retained in position thereon.

The focusing-cloth attachment is always set for use when required, and is much more handy and convenient than the focusing-cloth heretofore in use, it being especially adapted to be used in connection with photographic cameras for amateur purposes.

Having thus described my invention, I claim as new and desire to secure by Letters Patent—

1. A focusing-cloth attachment for photographic cameras, formed of a folding body and of a folding hood or head-piece applied to said body and provided with straps for attaching it to the head, substantially as set forth.

2. The combination, in a photographic camera, with a focusing-frame, of a focusing-cloth attachment composed of a folding body, and a cap or head-piece adapted to turn on said body, substantially as set forth.

3. In a photographic camera, the combination, with a focusing-frame, of a folding body formed of wire frames of diminishing size and a connecting-fabric, and a ring-shaped guide-frame connected to the outermost wire frame, and a cap or head-piece connected to said guide-frame and provided with straps for attachment to the head, substantially as set forth.

In testimony that I claim the foregoing as my invention I have signed my name in presence of two subscribing witnesses.

EUGEN HACKH.

Witnesses:
PAUL GOEPEL,
JOHN A. STRALEY.